United States Patent
King et al.

(10) Patent No.: US 10,734,885 B2
(45) Date of Patent: Aug. 4, 2020

(54) REMOVAL OF NEAR DC ERRORS IN A PEAK-CONTROLLED BOOST CONVERTER USING A LOW-BANDWIDTH SECONDARY CONTROL LOOP

(71) Applicant: Cirrus Logic International Semiconductor Ltd., Edinburgh (GB)

(72) Inventors: Eric J. King, Austin, TX (US);
Siddharth Maru, Austin, TX (US);
Thomas Hoff, Austin, TX (US);
Graeme G. Mackay, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/441,449

(22) Filed: Jun. 14, 2019

(65) Prior Publication Data
US 2019/0386561 A1 Dec. 19, 2019

Related U.S. Application Data

(60) Provisional application No. 62/686,963, filed on Jun. 19, 2018, provisional application No. 62/789,077, filed on Jan. 7, 2019.

(51) Int. Cl.
*H02M 1/42* (2007.01)
*H02M 3/158* (2006.01)
*G05F 1/46* (2006.01)

(52) U.S. Cl.
CPC ............. *H02M 1/42* (2013.01); *G05F 1/46* (2013.01); *H02M 3/1582* (2013.01)

(58) Field of Classification Search
CPC .......... H02M 1/42; H02M 1/56; H02M 1/575; H02M 3/156–158; H02M 3/1582;
(Continued)

(56) References Cited

U.S. PATENT DOCUMENTS

| 4,929,882 A * | 5/1990 | Szepesi ................. H02M 3/156 323/222 |
| 6,222,356 B1 * | 4/2001 | Taghizadeh-Kaschani ................ H02M 3/1563 323/288 |

(Continued)

FOREIGN PATENT DOCUMENTS

EP 2775599 A1 9/2014

OTHER PUBLICATIONS

International Search Report and Written Opinion of the International Searching Authority, International Application No. PCT/US2019/037483.
(Continued)

*Primary Examiner* — Yemane Mehari
(74) *Attorney, Agent, or Firm* — Jackson Walker L.L.P.

(57) ABSTRACT

A method may include controlling switching behavior of switches of a switch-mode power supply based on a desired physical quantity associated with the switch-mode power supply, wherein the desired physical quantity is based at least in part on a slope compensation signal, generating the slope compensation signal to have a compensation value of approximately zero as seen by a compensation control loop of the switch-mode power supply, and modifying the slope compensation signal on successive switching cycles of the switch-mode power supply to account for differences in an output of the compensation control loop and an average current of an inductor of the switch-mode power supply in at least one phase of a switching period of a switching cycle of the switch-mode power supply.

24 Claims, 4 Drawing Sheets

(58) Field of Classification Search
CPC .......... H02M 3/1588; G05F 1/46; G05F 1/52; G05F 1/62; G05F 1/575; Y02B 70/126; Y02B 70/1466
USPC ....... 323/222, 224, 259, 268, 271, 272, 282, 323/285, 288, 318
See application file for complete search history.

(56) References Cited

U.S. PATENT DOCUMENTS

| | | |
|---|---|---|
| 7,605,574 B2 | 10/2009 | Dearn et al. |
| 7,615,981 B2 | 11/2009 | Wong et al. |
| 8,686,767 B1 | 4/2014 | Nene |
| 8,937,469 B2 | 1/2015 | Clark et al. |
| 9,712,055 B1 | 7/2017 | Swartz et al. |
| 2006/0145675 A1 | 7/2006 | Lee et al. |
| 2006/0238174 A1 | 10/2006 | Russell et al. |
| 2009/0066301 A1* | 3/2009 | Oswald ............... H02M 3/1582 323/271 |
| 2011/0110132 A1 | 5/2011 | Rausch et al. |
| 2011/0204859 A1* | 8/2011 | Prodic ................. H02M 3/1588 323/271 |
| 2012/0275198 A1 | 11/2012 | Cohen |
| 2014/0111170 A1* | 4/2014 | Shi ...................... H02M 3/1588 323/271 |
| 2014/0239922 A1 | 8/2014 | Nene |
| 2014/0239935 A1 | 8/2014 | Nene |
| 2014/0247029 A1 | 9/2014 | Krabbenborg |
| 2014/0313799 A1 | 10/2014 | Hung et al. |
| 2015/0022172 A1 | 1/2015 | Hari et al. |
| 2015/0146458 A1 | 5/2015 | Lim |
| 2016/0006336 A1 | 1/2016 | Bennett et al. |
| 2019/0089245 A1 | 3/2019 | King et al. |
| 2019/0131871 A1* | 5/2019 | Krabbenborg .......... H02M 1/40 |
| 2019/0181754 A1* | 6/2019 | Ash ...................... H02M 3/157 |

OTHER PUBLICATIONS

International Search Report and Written Opinion of the International Searching Authority, International Application No. PCT/US2018/051284, dated Dec. 21, 2018.

* cited by examiner

REMOVAL OF NEAR DC ERRORS IN A PEAK-CONTROLLED BOOST CONVERTER USING A LOW-BANDWIDTH SECONDARY CONTROL LOOP

RELATED APPLICATION

The present disclosure claims priority to U.S. Provisional Patent Application Ser. No. 62/686,963, filed Jun. 19, 2018, and U.S. Provisional Patent Application Ser. No. 62/789,077 filed Jan. 7, 2019, both of which are incorporated by reference herein in their entirety.

FIELD OF DISCLOSURE

The present disclosure relates in general to circuits for electronic devices, including without limitation personal audio devices such as wireless telephones and media players, and more specifically, to limited average current in a peak-controlled boost converter.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers. Oftentimes, a power converter may be used to provide a supply voltage to a power amplifier in order to amplify a signal driven to speakers, headphones, or other transducers. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier.

Often, boost converters operate as peak current-controlled boost converters, wherein a main control loop of a control system is used to determine a peak current requirement on each switching phase of the boost converter in order to generate a desired boosted output voltage of the boost converter. For boost duty cycles where a duty cycle is greater than 50% (e.g., which may be determined by subtracting an arithmetic ratio from the number one, wherein the arithmetic ratio equals the input voltage supplied to the boost converter divided by the boost output voltage of the boost converter), slope compensation circuitry may be required to avoid sub-harmonic oscillatory behavior of the boost converter. Also present in many boost converter control systems is protection circuitry to ensure that the current of a boost converter is maintained below a maximum value. The detection of the peak current in accordance with the main control loop and detection of the maximum allowable current is often performed by two separate circuits: a first comparator comparing a measured current (e.g., measured current of a power inductor of the boost converter) with a slope-compensated target peak current signal, and a second comparator comparing the measured current to the maximum current limit without slope compensation. The main control loop, which may also be known as a compensator, may generate a signal indicative of a target peak current which may be modified by slope compensation circuitry, and such slope-compensated target peak current signal may be compared by the first comparator to the measured current in order to perform peak-current control of a boost converter. However, because slope compensation may occur in analog circuitry, an unknown amount of correction may exist at the point the first comparator toggles. Such error may be removed by the main control loop in regulating the boosted voltage output by the power converter.

However, the presence of this unknown error may result in the inability to directly control the maximum current during any specific switching cycle of the boost converter. This limitation arises because the second comparator allows for a measurement without slope compensation of the inductor current above a threshold. If the second comparator is used to control the current in the inductor directly, the lack of slope compensation on this measurement may result in sub-harmonic behavior. To avoid such sub-harmonic behavior while limiting the current as detected by the second comparator, the output of the second comparator may be fed back to allow control circuity to apply desired limit behavior to the slope-compensated target peak current signal. For example, an additional control loop may be present such that when operating under the current-limited condition, the slope-compensated target peak current signal is modified to obtain the desired limited current behavior.

As a result, a control system may be created that results in limiting and controlling the peak current of a power inductor of a boost converter below a maximum threshold. However, in many systems, an error between the peak inductor current and the average inductor current can be quite large and inductor variation can lead to significant challenges in determining a proper peak current limitation.

A prior solution to this problem of error between the peak inductor current and the average inductor current is to perform pre-compensation to achieve accurate peak current limiting in a boost converter, as described in U.S. patent application Ser. No. 16/202,463 filed Nov. 28, 2018 and entitled "Digital-to-Analog Converter with Embedded Minimal Error Adaptive Slope Compensation for Peak Current Controlled Switched Mode Power Supply," which is incorporated herein by reference in its entirety. In such approach, a pre-charge is added to a slope compensation signal to account for a reduction in peak current due to slope compensation. However, accurate peak current control may not lead to accurate average inductor current control due to switch impedances, equivalent series resistances of capacitors, direct current resistances of inductors, errors in estimating duty cycle of the boost converter, and/or other factors.

Another prior solution is the provision of a second control loop for accurate control of average inductor current, as described in U.S. patent application Ser. No. 16/122,619 filed Sep. 5, 2018 and entitled "Limiting Average Current in a Peak-Controlled Boost Converter," which is incorporated herein by reference in its entirety. While such solution may achieve more accurate average inductor current control, this solution comes at a cost of additional circuitry and complexity.

SUMMARY

In accordance with the teachings of the present disclosure, one or more disadvantages and problems associated with existing approaches to operating a power converter may be reduced or eliminated.

In accordance with embodiments of the present disclosure, a method may include controlling switching behavior of switches of a switch-mode power supply based on a desired physical quantity associated with the switch-mode power supply, wherein the desired physical quantity is based at least in part on a slope compensation signal, generating the slope compensation signal to have a compensation value of approximately zero as seen by a compensation control loop of the switch-mode power supply, and modifying the slope compensation signal on successive switching cycles of the switch-mode power supply to account for differences in an output of the compensation control loop and an average current of an inductor of the switch-mode power supply in at least one phase of a switching period of a switching cycle of the switch-mode power supply.

In accordance with these and other embodiments of the present disclosure, a system may include a switch control subsystem and a slope compensation subsystem. The switch control subsystem may be configured to control switching behavior of switches of a switch-mode power supply based on a desired physical quantity associated with the switch-mode power supply, wherein the desired physical quantity is based at least in part on a slope compensation signal. The slope generation subsystem may be configured to generate the slope compensation signal to have a compensation value of approximately zero as seen by a compensation control loop of the switch-mode power supply and modify the slope compensation signal on successive switching cycles of the switch-mode power supply to account for differences in an output of the compensation control loop and an average current of an inductor of the switch-mode power supply in at least one phase of a switching period of a switching cycle of the switch-mode power supply.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
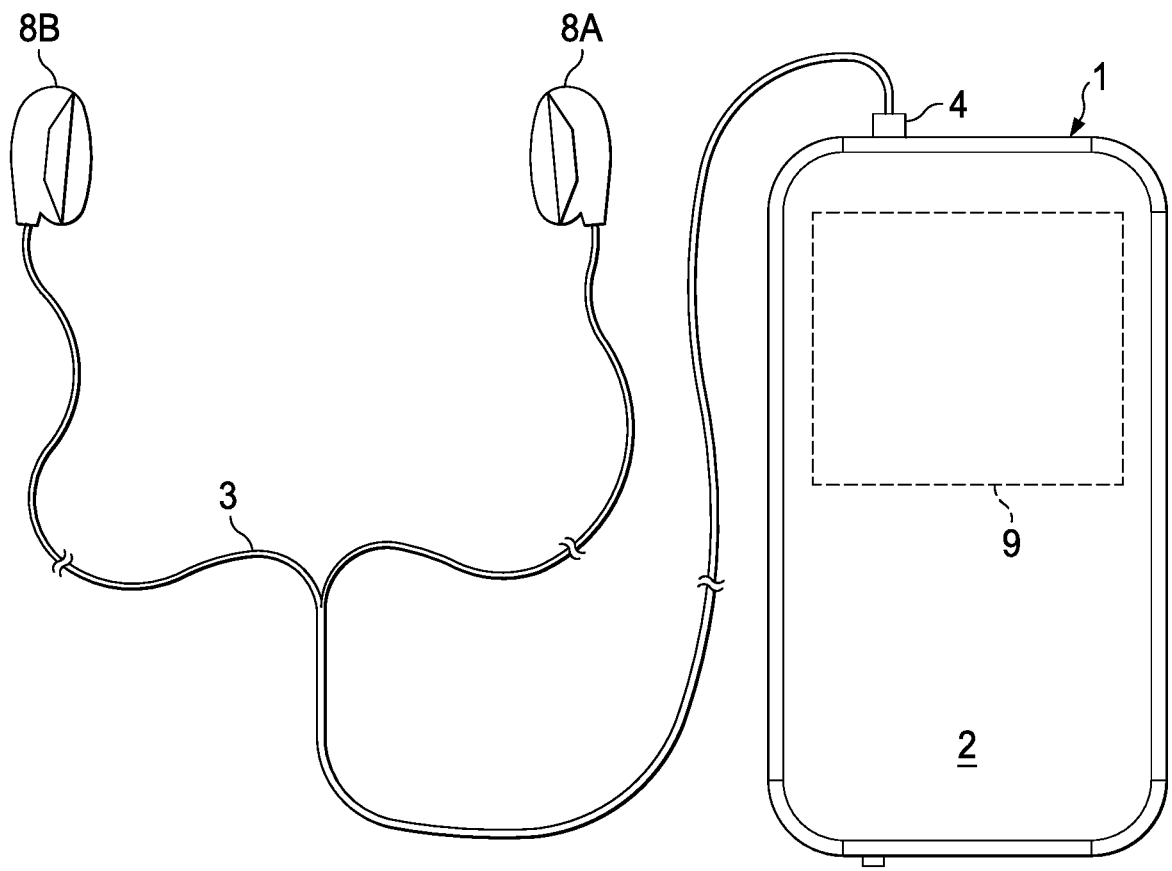
FIG. 1 illustrates an example personal audio device, in accordance with embodiments of the present disclosure.

FIG. 1 illustrates an example personal audio device 1, in accordance with embodiments of the present disclosure. FIG. 1 depicts personal audio device 1 coupled to a headset 3 in the form of a pair of earbud speakers 8A and 8B. Headset 3 depicted in FIG. 1 is merely an example, and it is understood that personal audio device 1 may be used in connection with a variety of audio transducers, including without limitation, headphones, earbuds, in-ear earphones, and external speakers. A plug 4 may provide for connection of headset 3 to an electrical terminal of personal audio device 1. Personal audio device 1 may provide a display to a user and receive user input using a touch screen 2, or alternatively, a standard liquid crystal display (LCD) may be combined with various buttons, sliders, and/or dials disposed on the face and/or sides of personal audio device 1. As also shown in FIG. 1, personal audio device 1 may include an audio integrated circuit (IC) 9 for generating an analog audio signal for transmission to headset 3 and/or another audio transducer.

Figure 2:
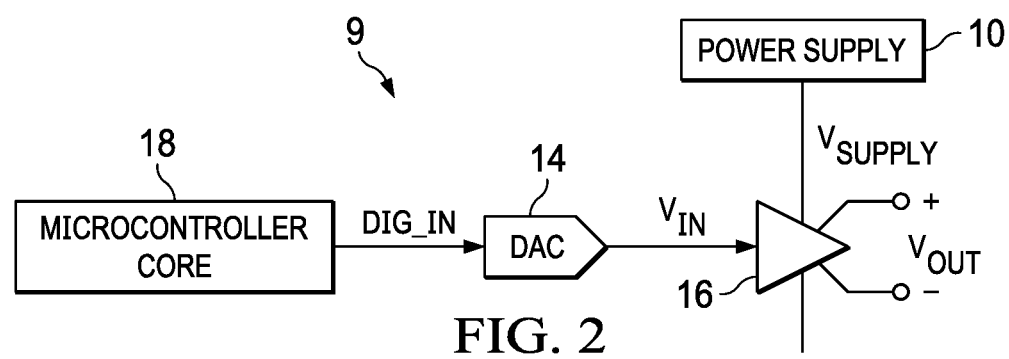
FIG. 2 illustrates a block diagram of selected components of an example audio integrated circuit of a personal audio device, in accordance with embodiments of the present disclosure.

FIG. 2 illustrates a block diagram of selected components of an example audio IC 9 of a personal audio device, in accordance with embodiments of the present disclosure. As shown in FIG. 2, a microcontroller core 18 may supply a digital audio input signal DIG_IN to a digital-to-analog converter (DAC) 14, which may convert the digital audio input signal to an analog signal $V_{IN}$. DAC 14 may supply analog signal $V_{IN}$ to an amplifier 16 which may amplify or attenuate audio input signal $V_{IN}$ to provide a differential audio output signal $V_{OUT}$, which may operate a speaker, a headphone transducer, a line level signal output, and/or other suitable output. In some embodiments, DAC 14 may be an integral component of amplifier 16. A power supply 10 may provide the power supply rail inputs of amplifier 16. In some embodiments, power supply 10 may comprise a switched-mode power converter, as described in greater detail below. Although FIGS. 1 and 2 contemplate that audio IC 9 resides in a personal audio device, systems and methods described herein may also be applied to electrical and electronic systems and devices other than a personal audio device, including audio systems for use in a computing device larger than a personal audio device, an automobile, a building, or other structure.

Figure 3:
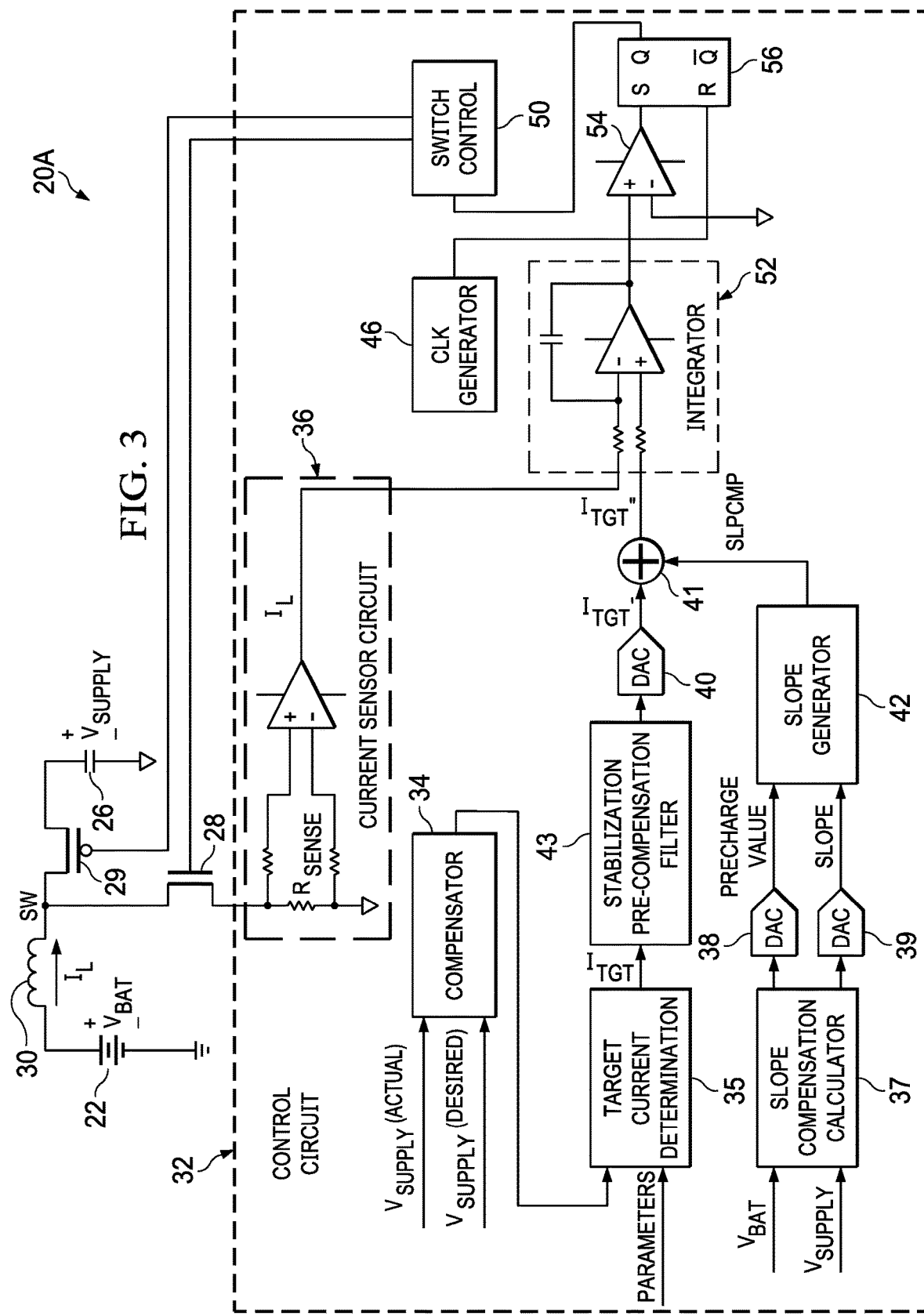
FIG. 3 illustrates a block diagram of selected components of an example peak-current mode control boost converter with pseudo average current limit control which may be used to implement the power supply shown in FIG. 2, in accordance with embodiments of the present disclosure.
Figure 4:
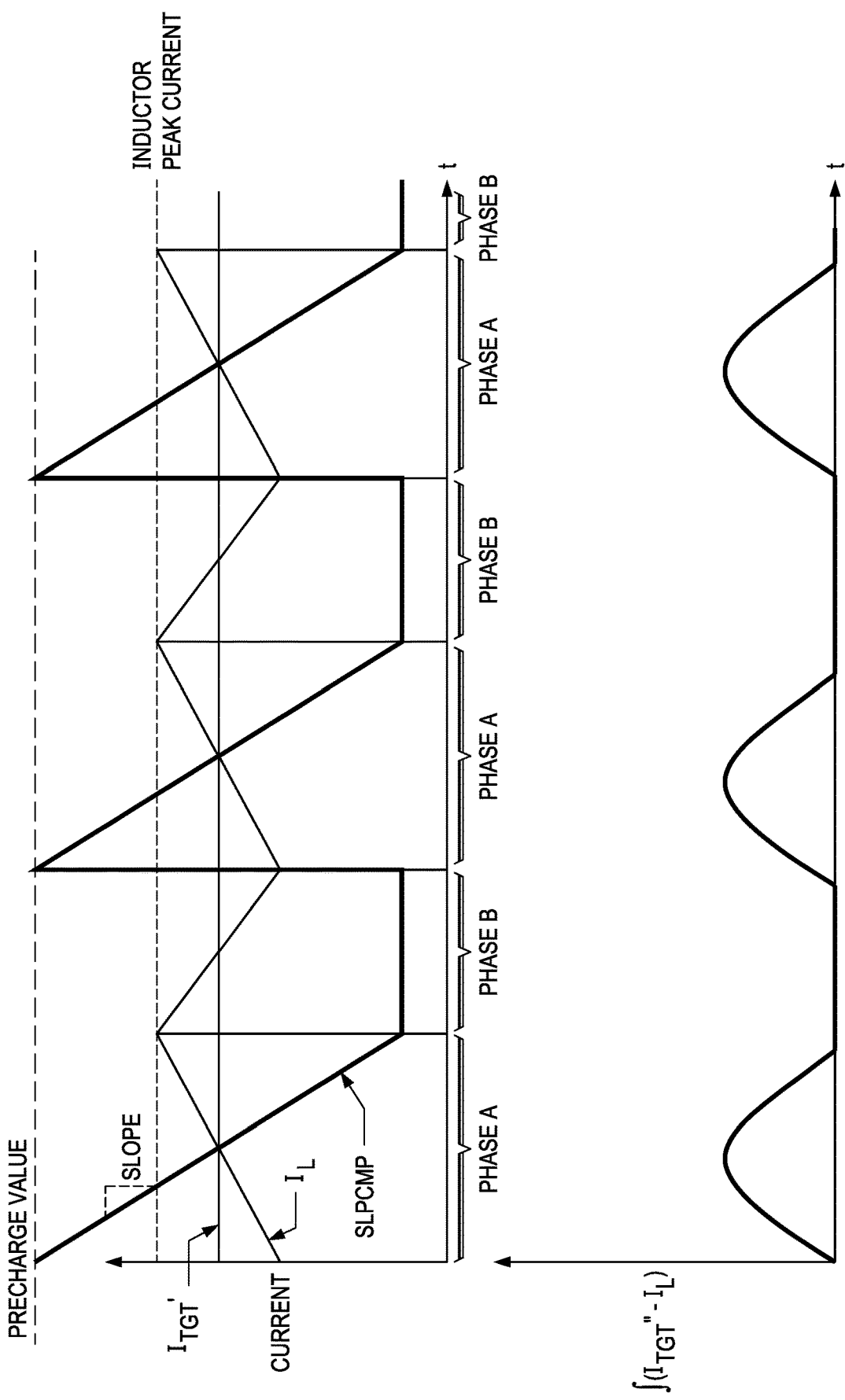
FIG. 4 illustrates graphs depicting example waveforms for actual inductor current and target average inductor current versus time, and for a mathematical integral of a difference of the quantity of the target average inductor current and the actual inductor current target, in accordance with embodiments of the present disclosure.

FIG. 3 illustrates a block diagram of selected components of an example peak-current mode control boost converter 20A with pseudo average current limit control which may be used to implement power supply 10 shown in FIG. 2, in accordance with embodiments of the present disclosure. As shown in FIG. 3, boost converter 20A may include a battery 22, a power inductor 30, a switch 28 implemented as an n-type metal-oxide-semiconductor field-effect transistor (NFET), a switch 29 implemented as a p-type metal-oxide-semiconductor field-effect transistor (PFET), and a control circuit 32. FIG. 4 illustrates graphs depicting example waveforms for actual inductor current $I_L$ and target average inductor current $I_{TGT}$ versus time and for a mathematical integral of a difference of the quantity of a slope compensated target inductor current $I_{TGT}"$ and actual inductor current $I_L$, in accordance with embodiments of the present disclosure. Slope compensated target inductor current $I_{TGT}''$ may be equal to a sum of target average inductor current (as pre-compensated by pre-compensation filter 43 and digitized by DAC 40) $I_{TGT}'$ and a slope compensation signal SLPCMP generated by a slope generator 42, as is described in greater detail elsewhere in this disclosure.

In a first phase (labeled as "Phase A" in FIG. 4) of a switching cycle of boost converter 20A, control circuit 32 may cause switch 28 to be activated (e.g., closed, turned on, enabled) and switch 29 to be deactivated (e.g., opened, turned off, disabled). Thus, during the first phase, a switch node (labeled as "SW" in FIG. 3) may be effectively shorted to a ground potential, such that battery 22 applies its voltage $V_{BAT}$ across terminals of power inductor 30. As a result, an inductor current $I_L$ flowing in power inductor 30 may increase during the first phase. As described in greater detail below, control circuit 32 may cause inductor current $I_L$ to increase until such point that a mathematical integral of a difference between current $I_L$ and a slope-compensated target current limit $I_{TGT}''$ reaches zero, at which the first phase may end.

In a second phase (labeled as "Phase B" in FIG. 4) of the switching cycle of boost converter 20A, control circuit 32 may cause switch 28 to be deactivated and switch 29 to be activated. As a result, inductor current $I_L$ may decrease during the second phase as power inductor 30 discharges into boost capacitor 26, boosting the supply voltage $V_{SUPPLY}$ to a voltage higher than battery voltage $V_{BAT}$. In continuous conduction mode (CCM), the second phase (Phase B) may continue until the end of the switching cycle, after which the first phase (Phase A) again occurs, as shown in FIG. 4. In discontinuous conduction mode (DCM), the second phase (Phase B) may continue until inductor current $I_L$ reaches zero, at which point a third phase (not shown in FIG. 4) of the switching cycle may begin. In the third phase, if it exists, control circuit 32 may cause both of switches 28 and 29 to be deactivated, and inductor current $I_L$ may remain at zero until the beginning of the next switching cycle, in which the first phase (Phase A) again occurs. In some embodiments, control circuit 32 may deactivate switch 29 during the second phase (Phase B), such that a body diode of the PFET implementing switch 29 conducts inductor current $I_L$ until it reaches zero.

As shown in FIG. 3, control circuit 32 may include a compensator 34, target current determination block 35, a slope compensation calculator 37, a stabilization pre-compensation filter 43, a digital-to-analog converter (DAC) 38, a DAC 39, a DAC 40, a slope generator 42, a clock (CLK) generator 46, a switch control block 50, an integrator 52, an integrator comparator 54, and a latch 56.

In operation, the duty cycle of switch 28 (e.g., the duration of the first phase (Phase A)) may determine the magnitude of supply voltage $V_{SUPPLY}$ relative to battery voltage $V_{BAT}$. For example, in CCM, the duty cycle D needed to provide a desired supply voltage $V_{SUPPLY}$ may be given by D=1−$V_{BAT}/V_{SUPPLY}$. Thus, for a desired level of supply voltage $V_{SUPPLY}$ (e.g., which may be based on an envelope of an output signal of an amplifier), control circuit 32 may implement a feedback control loop, which may be internal to compensator 34 (e.g., a filter with proportional-integral control), based on measured supply voltage $V_{SUPPLY}$ and measured inductor current $I_L$, which may be measured by current sensor circuit 36 (e.g., using a sense resistor with resistance $R_{SENSE}$; in some embodiments, $R_{SENSE}$ may have a resistance of approximately 10 mΩ). Thus, control circuit 32 may monitor actual supply voltage $V_{SUPPLY}$, compare it against a desired supply voltage $V_{SUPPLY}$, and increase or decrease actual supply voltage $V_{SUPPLY}$ by increasing or decreasing the peak of inductor current $I_L$. In that vein, compensator 34 in connection with target current determination block 35 may generate a digital signal indicative of a desired target average current $I_{TGT}$, which in turn may be filtered by stabilization pre-compensation filter 43 (functionality of stabilization pre-compensation filter 43 is described elsewhere in this disclosure). Other parameters received by target current determination block 35 that may be used to determine target average current $I_{TGT}$ may include battery voltage $V_{BAT}$ and/or a parameter programmed to be indicative of maximum current as a function of battery voltage $V_{BAT}$. Additional or alternative parameters may include digital audio input signal DIG_IN and/or analog signal $V_{IN}$. DAC 40 may convert the filtered digital signal output by stabilization pre-compensation filter 43 into an analog equivalent target current signal $I_{TGT}'$.

Slope generator 42 may generate a slope compensation signal SLPCMP as shown in FIG. 4. In some embodiments, slope generator 42 may generate the slope compensation signal as a triangle or sawtooth waveform. Slope compensation signal SLPCMP may be combined by combiner 41 with filtered target average current signal $I_{TGT}'$ to generate slope-compensated target current signal $I_{TGT}''$.

In order to generate slope compensation signal SLPCMP, slope compensation calculator 37 may receive digitalized signals representative of battery voltage $V_{BAT}$ supply voltage $V_{SUPPLY}$ generated by boost converter 20A and from such digitized signals, generate analog signals representative of an initial value PRECHARGE VALUE of slope compensation signal SLPCMP at the beginning of each switching cycle of boost converter 20A and a slope SLOPE of slope compensation signal SLPCMP. DACs 38 and 39 may convert the analog signals generated by slope compensation calculator 37 into digital signals PRECHARGE VALUE and SLOPE, respectively. The values for initial value PRECHARGE VALUE and slope SLOPE may be calculated such that: (i) slope compensation signal SLPCMP intersects with inductor current $I_L$ at the approximate midpoint of PHASE A of the switching cycle of boost converter 20A, and (ii) slope compensation signal SLPCMP applies an adjustment to filtered target average current signal $I_{TGT}'$ to effectively convert filtered target average current signal $I_{TGT}'$ to slope-compensated target current signal $I_{TGT}''$. In some embodiments, slope compensation calculator 37 may calculate initial value PRECHARGE VALUE and slope SLOPE as follows:

$$\text{PRECHARGE VALUE} = \frac{m_1 T_1}{2} + m T_1$$

$$\text{SLOPE} = 2m + m_1$$

where:

$$m_1 = \frac{V_{BAT}}{L}$$

and:

$$m = \frac{k(V_{SUPPLY} - V_{BAT})}{L}$$

further where $T_1$ is the duration of PHASE A, L is the inductance of power inductor 30, and k is a gain value that may be applied to allow for some margin in excess of that over the minimum required slope compensation to be applied in order to guarantee stability.

As a result, the PRECHARGE VALUE and slope SLOPE may be calculated such that given slope setting, the zero crossing of slope compensation signal SLPCMP occurs at the halfway point of Phase A of boost converter 20A.

To further illustrate operation of boost converter 20A, consider the waveforms for measured current $I_L$ and filtered target average current signal $I_{TGT}'$ shown in FIG. 4. Because boost converter 20A must operate with volt-second balancing, the average current during the second phase in CCM (Phase B) must be equal to average current during the first phase (Phase A) when in steady state. A simple analysis may show that during the first phase (Phase A), if the average current of power inductor 30 is equal to a desired average current equal to filtered target average current signal $I_{TGT}'$, the mathematical integral of the actual inductor current $I_L$ during the first phase (Phase A) will be equal to the mathematical integral of the desired average current during the first phase. Therefore, if the first phase (PHASE A) has a duration of time $T_1$, it is known that:

$$\frac{\int_0^{T_1} I_L}{T_1} = \frac{\int_0^{T_1} I'_{TGT}}{T_1}$$

Thus:

$$\int_0^{T_1} I_L = \int_0^{T_L} I'_{TGT}$$

and:

$$\int_0^{T_1} I_L - \int_0^{T_1} I'_{TGT} = 0$$

Therefore:

$$\int_0^{T_1} (I_L - I'_{TGT}) = 0$$

As the equations above show, if a difference between measured inductor current $I_L$ and target average current signal $I_{TGT}'$ is integrated over the first phase (Phase A), the result of the integration will be zero (0). The equations above show that if the value over the $T_1$ period is integrated, then the value will be zero. Likewise, if the difference is integrated, the $T_1$ value can be found when the result of the integral is zero (0). FIG. 4 also shows the value of the integration of a difference between measured inductor current $I_L$ and target average current signal $I_{TGT}$. The order of the subtraction is not as critical as the critical detection point is when the integral is equal to zero.

After adding slope compensation signal SLPCMP to target average current signal $I_{TGT}'$ to obtain slope-compensated target average current signal $I_{TGT}''$, the mathematical integral of slope-compensated target average current signal $I_{TGT}''$ may equal the integral of actual inductor current $I_L$ at the end of Phase A as the compensating slope may be symmetric around target average current signal $I_{TGT}$.

To take advantage of the above analysis, integrator 52 may calculate a mathematical integral of the difference between actual inductor current $I_L$ and slope-compensated target current signal $I_{TGT}''$, and integrator comparator 54 may compare the result to zero, such that latch 56 may generate an output indicative of when the integration performed by integrator 52 is zero. As a result of such output, control circuit 32 may appropriately modify target average current signal hue and slope-compensated target current signal $I_{TGT}''$ for subsequent switching cycles of boost converter 20A. Thus, integrator 52 may, during the first phase (Phase A), compare a measured inductor current $I_L$ (e.g., measured by current sensor circuit 36) to slope-compensated target current signal $I_{TGT}''$, generating a control signal responsive to the comparison. Together, the output of integrator 52, clock generator 46, integrator comparator 54 and latch 56 may be arranged as shown, or arranged in another suitable manner, to generate a control signal to switch control block 50. For example, clock generator 46 may generate a clock signal indicating the beginning of a switching cycle (e.g., beginning of the first phase/Phase A) and comparator 54 may, based on a point in which an integral of a difference between measured inductor current $I_L$ and slope-compensated target current signal $I_{TGT}''$ reaches zero, generate a signal indicating the end of the first phase (Phase A). Based on such signals indicating timing of switch cycles and switch phases of boost converter 20A, latch 56 may generate appropriate control signal(s) to switch control block 50, which may in turn generate appropriate control signals to switches 28 and 29 accordingly to selectively activate and deactivate switches 28 and 29.

In the absence of stabilization pre-compensation filter 43 (e.g., if stabilization pre-compensation filter 43 shown in FIG. 3 had a transfer function of 1), the presence of current averaging and the fact that the average current in only one of the switching phases is known (i.e., hence the term "pseudo averaging" is used as averaging calculations and control occur in only one phase of a switching cycle) introduce a complex double pole in the target current to average current transfer function. Consequently, a step in target average inductor current $I_{TGT}$ may lead to oscillations in the average current before it settles to a value equal to target average inductor current $I_{TGT}$. Thus, to stabilize the loop of control circuit 32, in addition to normal proportional-integral compensation implemented by compensator 34, stabilization pre-compensation filter 43 may implement a finite impulse response filter or other filter to cancel the complex double pole. Thus, a transfer function G(z) of stabilization pre-compensation filter 43 may be given by:

$$G(z)=a(1-bz^{-1}+cz^{-2})$$

where the values a, b, and c may be selected to cancel the complex double pole in the target current to average current transfer function. For example, in some embodiments, a=2/3, b=0.25, and c=0.75.

Figure 5:
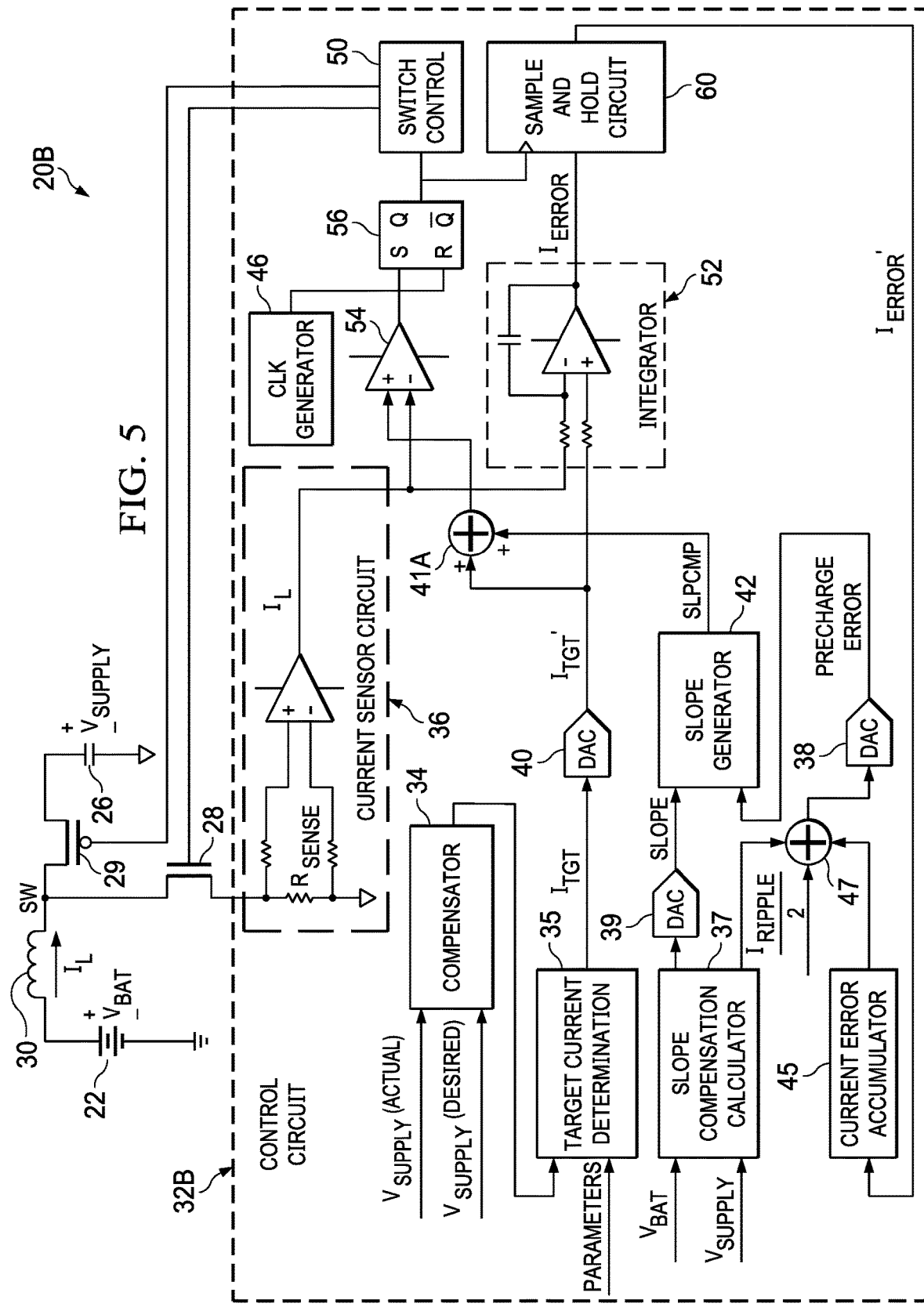
FIG. 5 illustrates a block diagram of selected components of another example peak-current control boost converter with pseudo average current limit control which may be used to implement the power supply shown in FIG. 2, in accordance with embodiments of the present disclosure.

FIG. 5 illustrates a block diagram of selected components of an example peak-current control boost converter 20B with pseudo average current limit control which may be used to implement power supply 10 shown in FIG. 2, in accordance with embodiments of the present disclosure. Boost converter 20B of FIG. 5 may be similar in many respects to boost converter 20A of FIG. 3. Accordingly, only the material differences between boost converter 20B and boost converter 20A are described below.

A main difference between boost converter 20B and boost converter 20A is that boost converter 20B includes control circuit 32B in lieu of control circuit 32A. Control circuit 32B of FIG. 5 may be similar in many respects to control circuit 32A of FIG. 3. Accordingly, only the material differences between control circuit 32B and control circuit 32A are described below.

A key difference between control circuit 32B and control circuit 32A is that control circuit 32B includes a current error accumulator 45 configured to receive a sampled integrated average error term $I_{ERROR}'$ generated by sample and hold circuit 60 by sampling a value of an integrated average error term $I_{ERROR}$ generated by integrator 52, wherein integrator 52 may integrate a difference between measured inductor current $I_L$ and target average inductor current $I_{TGT}'$. Sample and hold circuit 60 may be triggered (e.g., clocked) to sample integrated average error term $I_{ERROR}$ at the time latch 56 generates a control signal for deactivating switch 28 of boost converter 20B, thus sampling integrated average error term $I_{ERROR}$ at a time when inductor current $I_L$ has reached its peak current.

Current error accumulator 45 may be further configured to maintain an accumulated error equal to accumulation of the sampled integrated average error term $I_{ERROR}'$ and generate an error correction signal for driving the accumulated error to zero. Such error correction signal may be combined by combiner 47 with a precharge value generated by slope compensation calculator 37 and a term equal to half of a ripple current $I_{RIPPLE}$, wherein ripple current $I_{RIPPLE}$ refers to a difference between an average of inductor current $I_L$ per cycle and a peak of inductor current $I_L$ in a cycle. Slope generator 42 may in turn generate slope compensation signal SLPCMP based on slope signal SLOPE and the combined PRECHARGE+ERROR signal (in lieu of only the PRECHARGE VALUE as was the case in FIG. 3). The combined PRECHARGE+ERROR signal component of slope compensation signal SLPCMP may compensate to errors within target average inductor current $I_{TGT}'$. Combiner 41A may combine measured inductor current $I_L$, target average inductor current $I_{TGT}'$, and slope compensation signal SLPCMP, such that the combined PRECHARGE+ERROR signal component of slope compensation signal SLPCMP ultimately compensates switch control signals generated by switch control block 50 in order to compensate for loop errors.

Accordingly, the peak current loop is similar to that of the patent applications described in the Background section, with the PRECHARGE VALUE and SLPCMP signals derived in a manner similar to that of peak-current control boost converter 20A FIG. 3 and its accompanying description. However, an additional benefit of peak-current control boost converter 20B over peak-current control boost converter 20A is that direct current (DC) errors are moved from the control loop of compensator 34 and placed into signal PRECHARGE VALUE of the slope compensation circuitry. The loop bandwidth of the loop of slope compensation circuitry may be lower of the loop bandwidth of the loop of compensator 34 because these errors are not transient errors, but include mainly near-DC errors (e.g., inductance tolerance, duty cycle variations due to power supply, etc.).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method, comprising:
controlling switching behavior of switches of a switch-mode power supply based on a desired physical quantity associated with the switch-mode power supply, wherein the desired physical quantity is based at least in part on a slope compensation signal;
generating the slope compensation signal to have a compensation value of approximately zero as seen by a compensation control loop of the switch-mode power supply; and
modifying the slope compensation signal on successive switching cycles of the switch-mode power supply to account for differences in an output of the compensation control loop and an average current of an inductor of the switch-mode power supply in at least one phase of a switching period of a switching cycle of the switch-mode power supply.

2. The method of claim 1, wherein modifying the slope compensation signal comprises modifying a starting value of the slope compensation signal.

3. The method of claim 2, wherein modifying the slope compensation signal comprises filtering a difference between the output of the compensation control loop and the average current of the inductor in at least one phase of the switching period of the switching cycle of the switch-mode power supply.

4. The method of claim 1, further comprising generating the slope compensation signal to have a compensation value of approximately zero at a midpoint of a duration of a duty cycle of operation of the switch-mode power supply.

5. The method of claim 1, wherein generating the slope compensation signal includes setting a starting value of the slope compensation signal based on calculations for determining a duty cycle of the switch-mode power supply.

6. The method of claim 1, wherein generating the slope compensation signal includes setting a starting value of the slope compensation signal based on a supply voltage to and an output voltage generated by the switch-mode power supply.

7. The method of claim 6, further wherein generating the slope compensation signal includes setting the starting value of the slope compensation signal based on an inductance of a power inductor of the switch-mode power supply.

8. The method of claim 1, wherein generating the slope compensation signal includes setting a starting value of the slope compensation signal based on an integrated error between the desired physical quantity and a measured physical quantity, wherein the measured physical quantity is controlled by the desired physical quantity.

9. The method of claim 1, further comprising pre-compensating the desired physical quantity to reduce transient oscillations resulting from changes to the desired physical quantity.

10. The method of claim 1, wherein the desired physical quantity is a desired average current associated with the switch-mode power supply.

11. The method of claim 1, further comprising:
monitoring a measured current through a power inductor of a boost converter; and
detecting when a mathematical integral of a difference between the measured current and a desired average current for the power inductor is equal to zero.

12. The method of claim 11, further comprising controlling switching behavior of switches of the boost converter based on the detection of when the mathematical integral of the difference is equal to zero.

13. A system, comprising:
a switch control subsystem configured to control switching behavior of switches of a switch-mode power supply based on a desired physical quantity associated with the switch-mode power supply, wherein the desired physical quantity is based at least in part on a slope compensation signal;
a slope generation subsystem configured to:
generate the slope compensation signal to have a compensation value of approximately zero as seen by a compensation control loop of the switch-mode power supply; and
modify the slope compensation signal on successive switching cycles of the switch-mode power supply to account for differences in an output of the compensation control loop and an average current of an inductor of the switch-mode power supply in at least one phase of a switching period of a switching cycle of the switch-mode power supply.

14. The system of claim 13, wherein modifying the slope compensation signal comprises modifying a starting value of the slope compensation signal.

15. The system of claim 14, wherein modifying the slope compensation signal comprises filtering a difference between the output of the compensation control loop and the average current of the inductor in at least one phase of the switching period of the switching cycle of the switch-mode power supply.

16. The system of claim 13, wherein the slope compensation subsystem is further configured to generate the slope compensation signal to have a compensation value of approximately zero at a midpoint of a duration of a duty cycle of operation of the switch-mode power supply.

17. The system of claim 13, wherein generating the slope compensation signal includes setting a starting value of the slope compensation signal based on calculations for determining a duty cycle of the switch-mode power supply.

18. The system of claim 13, wherein generating the slope compensation signal includes setting a starting value of the slope compensation signal based on a supply voltage to and an output voltage generated by the switch-mode power supply.

19. The system of claim 18, further wherein generating the slope compensation signal includes setting the starting value of the slope compensation signal based on an inductance of a power inductor of the switch-mode power supply.

20. The system of claim 13, wherein generating the slope compensation signal includes setting a starting value of the slope compensation signal based on an integrated error between the desired physical quantity and a measured physical quantity, wherein the measured physical quantity is controlled by the desired physical quantity.

21. The system of claim 13, wherein the slope compensation subsystem is further configured to pre-compensate the desired physical quantity to reduce transient oscillations resulting from changes to the desired physical quantity.

22. The system of claim 13, wherein the desired physical quantity is a desired average current associated with the switch-mode power supply.

23. The system of claim 13, wherein the slope compensation subsystem is further configured to:
monitor a measured current through a power inductor of a boost converter; and
detect when a mathematical integral of a difference between the measured current and a desired average current for the power inductor is equal to zero.

24. The system of claim 23, wherein the switch control subsystem is further configured to control switching behavior of switches of the boost converter based on the detection of when the mathematical integral of the difference is equal to zero.

* * * * *